(12) United States Patent
Kato et al.

(10) Patent No.: US 6,836,354 B2
(45) Date of Patent: Dec. 28, 2004

(54) METHOD FOR PRODUCING OPTICAL WAVEGUIDES, OPTICAL WAVEGUIDES AND FREQUENCY CONVERTING DEVICES

(75) Inventors: Kenji Kato, Ama-Gun (JP); Yoshimasa Kondo, Nagoya (JP); Takashi Yoshino, Ama-Gun (JP); Makoto Oomori, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 239 days.

(21) Appl. No.: 10/163,967

(22) Filed: Jun. 6, 2002

(65) Prior Publication Data

US 2002/0191934 A1 Dec. 19, 2002

(30) Foreign Application Priority Data

Jun. 13, 2001 (JP) .................................. P2001-177994

(51) Int. Cl.[7] .............................. G02F 1/365; B05D 3/06
(52) U.S. Cl. ..................... 359/332; 427/163.2; 427/555
(58) Field of Search ................................ 359/326–332; 427/163.2, 164, 165, 554, 555, 271–273

(56) References Cited

U.S. PATENT DOCUMENTS 5,866,200 A 2/1999 Yoshino et al. .......... 427/163.2

FOREIGN PATENT DOCUMENTS

| JP | 07-284966 A | 10/1995 | .......... B23K/26/00 |
| JP | 08-187588 A | 7/1996 | .......... B23K/26/16 |
| JP | 09-269430 A | 10/1997 | ............ G02B/6/13 |
| JP | 9-269430 | 10/1997 | ............ G02B/6/13 |
| JP | 2000-246475 A | 9/2000 | .......... B23K/26/00 |

Primary Examiner—John D. Lee
(74) Attorney, Agent, or Firm—Burr & Brown

(57) ABSTRACT

A method for producing an optical waveguide by irradiating a laser beam onto an oxide single crystal material includes a means by which the scattering of light from the surface of the waveguide may be prevented when light is transmitted through the waveguide. A laser beam is irradiated onto an oxide single crystal to from an optical waveguide portion defined by laser working faces, which are then subjected to a wet etching process using, for example, a strong alkaline solution.

15 Claims, 4 Drawing Sheets

(a)

(b)

METHOD FOR PRODUCING OPTICAL WAVEGUIDES, OPTICAL WAVEGUIDES AND FREQUENCY CONVERTING DEVICES

This application claims the benefit of Japanese Patent Application P2001-177, 994, filed on Jun. 13, 2001, the entirety of which is incorporated by reference.

BACKGROUND OF THE INVENTION

1. Field of the Invention

The invention relates to a process for producing an optical waveguide, which may be preferably used as a device for generating second harmonic wave of quasi-phase matched system and optical modulator.

2. Related Art Statement

Recently, it has been studied to develop a device for light modulation by forming an optical waveguide in various kinds of materials. Such devices are used in systems for optical communication. The so-called ridge shaped optical waveguides have been expected as optical modulators, optical switching devices or the like. It is proposed a Quasi-phase matched (QPM) type second harmonic generation (SHG) device using an optical waveguide made of a lithium niobate or lithium tantalate single crystal, in which a periodically reversed polarization structure is formed. Such SHG device has been expected as a blue laser light source to be used for light pickups. The second harmonic generation devices find a wide range of applications such as optical disc memorization, medical uses, optochemical uses, various optical measurements, etc.

Japanese patent laid-open publication (Kokai) A269,430/1997 discloses a process of producing a ridge-shaped optical waveguide used for a device for generating a second harmonic wave. The waveguide is formed by subjecting an oxide single crystal to abrasion working using an excimer laser. Such oxide single crystal includes lithium niobate and a lithium niobate-lithium tantalate solid solution.

SUMMARY OF THE INVENTION

The inventors have further studied the above process and found the following problems. That is, after a substrate comprising, for example, lithium niobate single crystal is subjected to laser working using an excimer laser to form an optical waveguide, they irradiated coherent light into the resulting optical waveguide. They found that a part of the coherent light may be scattered from the surface of the optical waveguide, resulting in optical loss.

It is an object of the invention is to provide a method for producing an optical waveguide by irradiating a laser ray onto a substrate made of an oxide single crystal so that the scattering of light from the surface of the optical waveguide may be prevented when light is transmitted through the waveguide.

The invention provides a method for producing an optical waveguide, the method including the steps of:

irradiating a laser beam onto an oxide single crystal material so that the material is worked by the laser beam to form an optical waveguide portion having a laser working face; and subjecting the laser working face to a wet etching treatment to provide an optical waveguide.

The invention further provides an optical waveguide produced by the above method.

The invention further provides a frequency converting device of quasi-phase-matched system, including:

an optical waveguide produced by the method; and a periodically reversed polarization structure formed in the optical waveguide.

The inventors have studied the cause of the scattering of light from the surface of the optical waveguide when transmitting light through the waveguide, and found the followings. That is, a kind of microscopic product as a result of the laser working (referred to as "working product") is adhered on the surface of the waveguide formed by laser ablation working, resulting in the scattering of light on the interface between the working product and the surface of the waveguide.

The scattering of light along the interface between the working product and waveguide means that the refractive indexes of the working product and the oxide single crystal constituting the waveguide are different with each other. It is considered that the material of the working product is different from the oxide single crystal constituting the waveguide, based on the difference of the refractive indexes.

The inventors have then studied, based on the above findings, a process for selectively removing the working product and preventing the introduction of roughness on the surface of the optical waveguide. They finally found that a wet etching treatment under a condition for removing the working product is effective for removing the working product without introducing the excessive roughness or deficiencies on the surface of the optical waveguide. The scattering of light on the surface of the waveguide may be thus prevented.

These and other objects, features and advantages of the invention will be appreciated upon reading the following description of the invention when taken in conjunction with the attached drawings, with the understanding that some modifications, variations and changes of the same could be made by the skilled person in the art.

BRIEF DESCRIPTION OF THE DRAWINGS

FIG. 2(*b*) is an enlarged view of a part of FIG. 2(*a*).

DETAILED DESCRIPTION OF THE INVENTION

Figure 1:
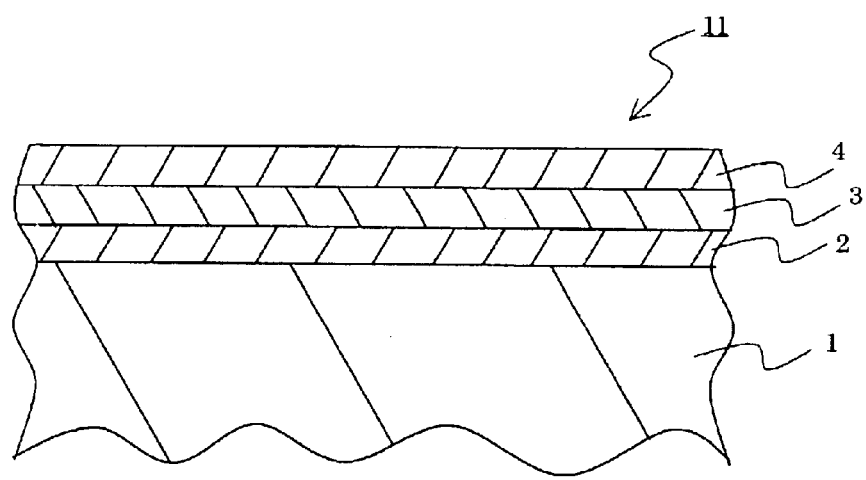
FIG. 1 is a cross sectional view schematically showing a work before laser working.
Figure 2:
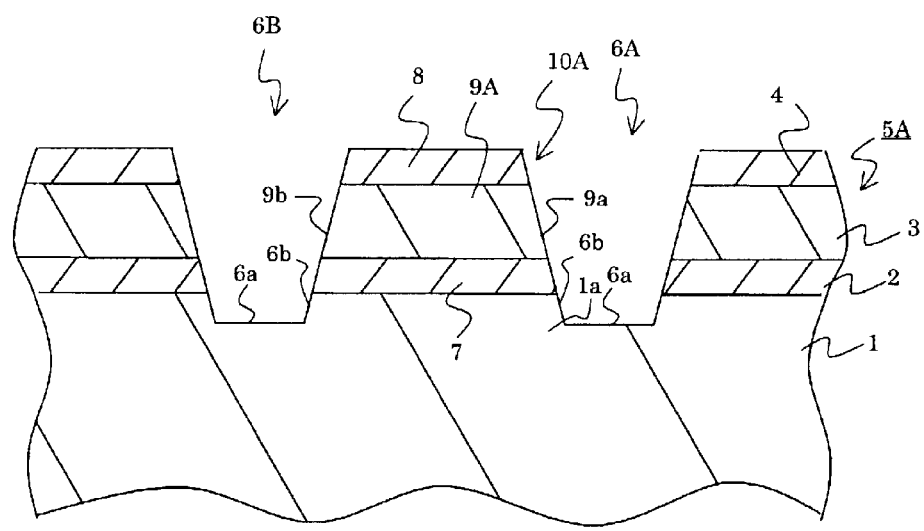
FIG. 2(*a*) is a cross sectional view schematically showing an optical waveguide device 5A formed by laser working.
Figure 2:
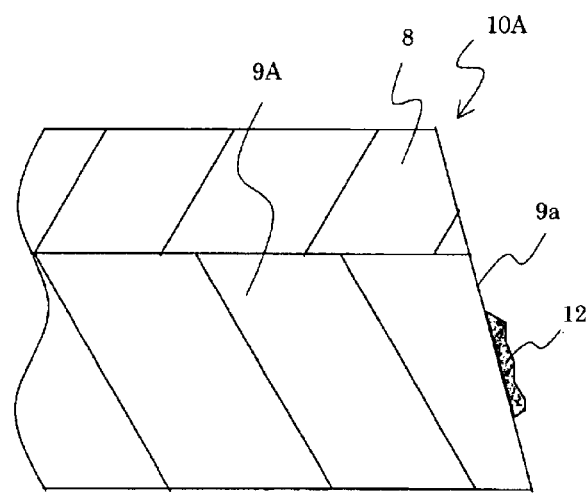

The invention will be further described below in detail referring to the attached drawings. FIG. 1 is a cross sectional view schematically showing a work 11 before laser working. FIG. 2(*a*) is a cross sectional view schematically showing an optical waveguide device 5A formed by laser working, and FIG. 2(*b*) is an enlarged view of a part of FIG. 2(*a*).

As shown in FIG. 1, a substrate 11 in this example has a substrate 1, an under clad layer 2, a layer 3 of a higher refractive index and an over clad layer 4. At least the layer 3 is made of an oxide single crystal. The refractive index of the layer 3 is sufficiently higher than those of the over clad layer 3 and under clad layer 2 so that light may be transmitted within the layer 3 of a higher refractive index.

A laser ray is irradiated onto the surface of the substrate 11 to form grooves 6A and 6B having the shapes shown in FIG. 2(a). The grooves 6A and 6B may preferably be elongated in parallel with each other so that a ridge shaped structure 10A is formed between and defined by the grooves 6A and 6B. A bottom face 6a and a side wall face 6b of the groove are laser working faces. The layer 3 of a higher refractive index is subjected to laser irradiation working to form an optical waveguide portion 9A in the ridge-shaped structure 10A. Faces 9a and 9b are formed by the laser working. The optical waveguide portion 9A is sandwiched by the over clad layer 8 and under clad layer 8.

Particularly as schematically shown in FIG. 2(b), working product 12 may adhere onto the face 9a (9b) formed by laser working of the optical waveguide. The presence, as well as its properties, has not been known. The scattering of light was observed from the interface of the optical waveguide 9A and working product 12. Such scattering of light may indicate that the refractive indexes of the working product and the material constituting the waveguide are different from each other. The inventors found that the working product may be removed by a wet etching treatment. Additionally, they found that the wet etching carried out under a condition sufficient for removing the working product does introduce excessive surface roughness or deficiencies on the laser working face 9a (9b) of the waveguide 9A.

Figure 3:
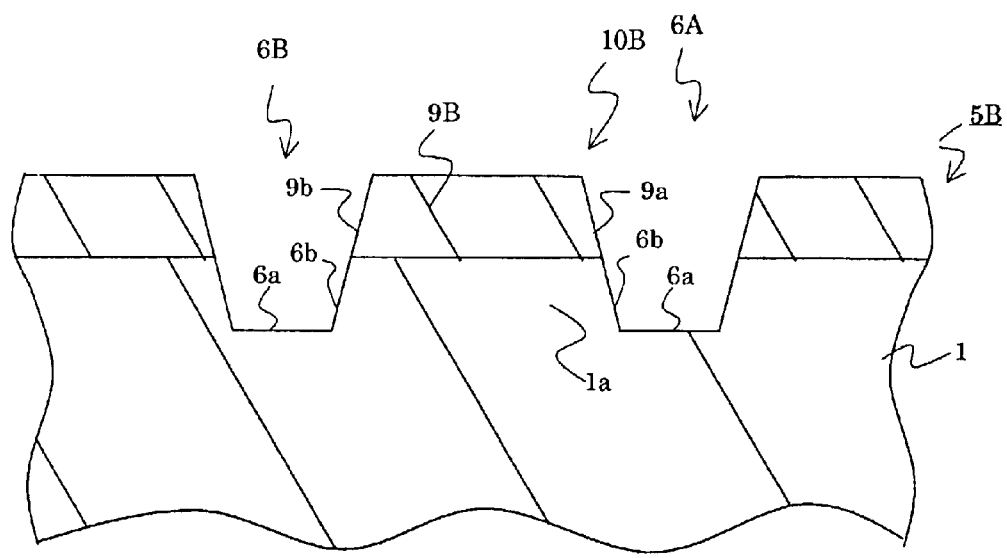
FIG. 3 is a cross sectional view schematically showing an optical waveguide device 5B formed by laser working.

In the invention, the shape and pattern of the optical waveguide are not particularly limited. For example, an optical waveguide device 5B shown in FIG. 3 has a ridge-shaped structure 10B. The structure 10B has a ridge portion 1a of a substrate 1 and a three-dimensional optical waveguide 9B formed on the ridge portion 1a.

Figure 4:
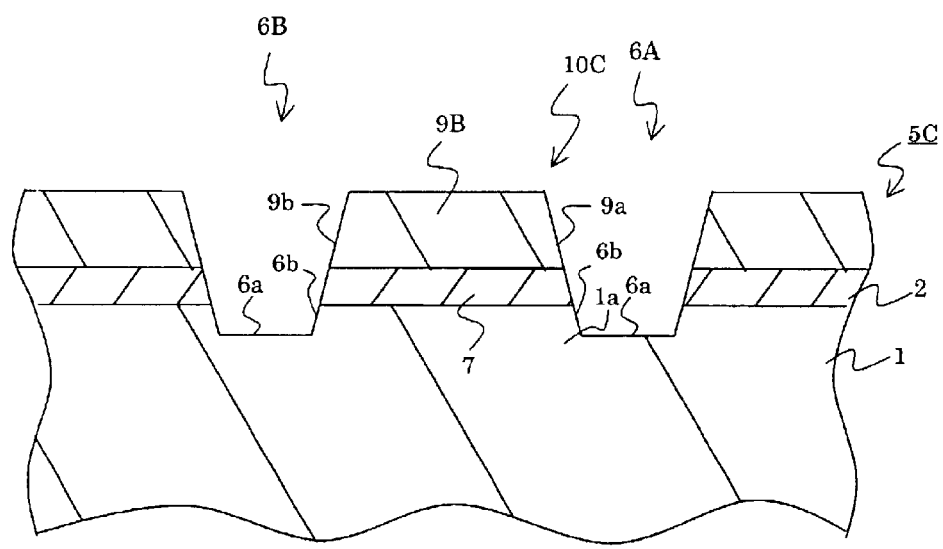
FIG. 4 is a cross sectional view schematically showing an optical waveguide device 5C formed by laser working.

An optical waveguide device 5C shown in FIG. 4 has a ridge-shaped structure 10C. The structure 10C has a ridge portion 1a of a substrate 1, an under clad layer 7 formed on the ridge portion 1a, and a three dimensional optical waveguide 9B formed on the under clad layer 7.

In the invention, an optical waveguide is made of an oxide single crystal. Parts other than the optical waveguide (for example, under clad layer, over clad layer and substrate) in an optical waveguide device may be made of an oxide single crystal or another material. Such another material includes a ceramic material and an optical resin.

An optical waveguide may preferably be and, is not particularly limited to, a three-dimensional optical waveguide, and may be a slab optical waveguide.

In a preferred embodiment, the oxide single crystal constituting an optical waveguide is a complex oxide of a plurality of metal elements. The working product is made mainly of the oxide of one or more metal element constituting the oxide single crystal. In a particularly preferred embodiment, the working product is mainly made of the oxide of one metal element constituting the oxide single crystal.

The working product may contain one or more doped metal elements or impurities other than the main component of the metal oxide.

In a particularly preferred embodiment, the oxide single crystal is a complex oxide of lithium and another metal element, and the working product is mainly composed of the oxide of the a metal element other than lithium. When the oxide single crystal is a complex oxide containing lithium and another metal element, the following mechanism may be considered. Lithium atoms contained in the oxide single crystal may be easily evaporated or dissipated during the laser working of the crystal. Consequently, the oxide of the metal element other than lithium thus tends to remain in the surface region of the optical waveguide formed by the working.

In a still preferred embodiment, the metal element other than lithium is one or more element selected from the group consisting of niobium, tantalum and potassium. Such oxide single crystal includes lithium niobate, lithium tantalate, a lithium niobate-lithium tantalate solid solution, potassium lithium niobate, potassium lithium tantalate and a potassium lithium niobate-potassium lithium tantalate solid solution. In these cases, the main component of the working product was niobium oxide, tantalum oxide or a niobium oxide-tantalum oxide. The material of the working product may contain a metal element other than lithium, potassium, niobium and tantalum as a dopant, as long as the dopant does not substantially change the crystalline structure of the oxide single crystal.

In a still preferred embodiment, the oxide single crystal is selected from the group consisting of lithium niobate, lithium tantalate and a lithium niobate-lithium tantalate solid solution.

The oxide single crystal constituting the optical waveguide may contain a dopant of one or more rare earth elements. The doped rare earth element may function as an additive for laser oscillation. The doped rare earth element may preferably be Nd, Er, Tm, Ho, Dy or Pr.

It may be added into the oxide single crystal, as a dopant, one or more metal elements selected from the group consisting of magnesium, zinc, titanium, vanadium, iron, scandium and indium. These elements may be effective for improving the resistance against optical damage.

A process for wet etching the optical waveguide portion is not particularly limited. An etchant used for the wet etching includes various kinds of alkaline agents and acids. A strong etchant such as hydrofluoric acid may preferably be avoided as far as the oxide single crystal constituting the optical waveguide is etched under a condition necessary for removing the working product.

In a preferred embodiment, the etchant is a strong alkaline agent having a pH of not lower than 14. Such etchant includes, but is not limited to, a solution containing the hydroxide of an alkali metal. The hydroxide of an alkali metal may preferably be sodium hydroxide, potassium hydroxide or a mixture of sodium hydroxide and potassium hydroxide. The solution may be a solution of an organic solvent, in which an alkali metal hydroxide is soluble, and preferably be an aqueous solution.

The temperature of the etchant during the wet etching treatment is not particularly limited. The temperature may, however, preferably be not lower than 50° C. and more preferably be not lower than 70° C. for completing the removing process of the working product. Further, the temperature may preferably be not higher than 90° C. and more preferably be not lower than 80° C., for preventing the introduction of surface roughness on the surface of the underlying optical waveguide.

The process of laser working is basically disclosed in Japanese Patent laid-open publication (Kokai) A269, 430. For example, an oxide single crystal may preferably be worked by using an excimer laser or the fourth harmonic wave of Nd-YAG laser, and more preferably an excimer laser.

An excimer laser is a pulse repetition oscillation laser outputting ultraviolet rays. In the laser oscillation system, a gaseous compound such as ArF (wavelength of 193 nm), KrF (wavelength of 248 nm) and XeCl (wavelength of 308 nm) oscillates ultraviolet ray pulses. The pulses are then arrayed by means of an optical resonator and output in the arrayed state.

Applications of an excimer laser are described in a literature such as "Excimer laser now in a practically applicable stage" in "O plus E" No. 11, pp 64 to 108, November 1995.

In a preferred embodiment, the laser ray for the working may preferably have a wavelength of 190 to 400 nm, and more preferably 193 to 337 nm.

The optical waveguide device according to the invention may be used for fabricating an optical modulator for modulating the intensity or phase of light and optical switching device. In this case, the shape or pattern of the electrode for modulating light is not particularly limited. Moreover, it is possible to provide a frequency converting device by forming a periodically reversed polarization structure in the optical waveguide of the inventive optical waveguide device.

EXAMPLES (Experiment A)

A device 5A shown in FIG. 2(a) was produced according to the process explained referring to FIGS. 1 and 2. A three-inch wafer of a thickness of 0.5 mm and made of $LiNbO_3$ single crystal was prepared. An under clad layer 2 made of the single crystal of a lithium niobate-lithium tantalate solid solution was formed on the wafer by means of liquid phase epitaxial process. An optical waveguide layer 3 made of lithium niobate single crystal was then formed on the under clad layer 2. An over clad layer 4 made of the single crystal of a lithium niobate-lithium tantalate solid solution was then formed on the optical waveguide layer 3 by means of liquid phase epitaxial process.

An excimer laser (of a wavelength of 248 nm) was irradiated onto the wafer using spot scanning method to form grooves 6A and 6B. The power of the laser ray on the surface of the wafer was set at 1 $J/cm^2$, the scanning speed 0.1 mm/s, the pulse repetition frequency 50 Hz, and the pulse width 3 nsec. The grooves 6A and 6B each having a depth of 5 $\mu$m and a width of 5 $\mu$m were formed by this process.

A single-mode optical fiber was connected to the end face of the optical waveguide 9A. A laser ray was then irradiated into the optical fiber connected. It was observed the scattering of light on the laser working faces 9a and 9b of the optical waveguide 9A.

The working product was observed on the laser working face of the optical waveguide 9A. The working product was analyzed by means of an X-ray diffraction method so that diffraction peaks corresponding to those of niobium oxide were observed. Diffraction peaks corresponding to those of lithium niobate were not observed. The results were also confirmed by the analysis by means of EDX.

The surface of the device was then subjected to wet etching process using various kinds of etchants. Each sample was cut out from the device and immersed into each etchant at 70° C. for 10 minutes. The sample was then immersed into pure water at 70° C. for 10 minutes and then washed by pure water at ambient temperature. The resulting sample was treated with a dehumidifying air gun to remove moisture from the sample and dried.

The etchant used for the wet etching was changed as follows.

(Etchant 1: Strong Alkaline Aqueous Solution)

A strong alkaline aqueous solution having a pH of higher than 14 was used. The solution contains 25 weight percent of potassium hydroxide and 30 weight percent of sodium hydroxide. Consequently, the working product was removed after the wet etching. The trace of the etching was not particularly found and surface roughness was not introduced on the surface.

(Etchant 2: Weak Alkaline Aqueous Solution)

A weak alkaline aqueous solution with a pH of 9 to 10 was used. The solution contains 25 weight percent of potassium hydroxide and 30 weight percent of sodium hydroxide. Consequently, the working product was etched to some degree but substantially remained on the surface of the optical waveguide. The trace of etching was not observed on the surface of the optical waveguide 9A.

(Etchant 3: Aqueous Solution of Strong Acid)

An aqueous solution of a strong acid was used. The solution contains 50 weight percent of sulfuric acid. Consequently, the working product was slightly etched but almost remained on the surface of the optical waveguide. Etching traces were observed on the surface of the optical waveguide 9A.

(Etchant 4: Aqueous Solution of a Weak Acid)

Aqueous solution of a weak acid was used. The solution contains 20 weight percent of ammonia. Consequently, the working product was etched but remained on the surface of the optical waveguide. Etching traces were not observed on the surface of the waveguide 9A.

(Experiment B)

A wafer made of a single crystal of a potassium lithium niobate was prepared.

An excimer laser with a wavelength of 248 nm was irradiated onto the wafer by means of spot scanning method to form two grooves parallel with each other. The power of the laser at the surface of the wafer was set to 1 $J/cm^2$, the scanning speed 0.1 mm/s, pulse repetition frequency 50 Hz, and pulse width 3 nsec. The grooves each having a depth of 5 $\mu$m and a width of 5 $\mu$m were formed after the working.

The working product on the surface of the optical waveguide was analyzed by X-ray diffraction analysis so that the diffraction peaks corresponding with those of niobium oxide were observed and those of potassium lithium niobate were not observed. The results were also supported by the analysis by EDX.

A sample was cut out from the wafer and subjected to the wet etching treatment using each of the etchants 1, 2, 3 and 4. The results will be explained.

(Etchant 1: Strong Alkaline Aqueous Solution)

The working product was removed after the etching. Etching traces were not observed on the surface of the optical waveguide, without surface roughness observed.

(Etchant 2: Weak Alkaline Aqueous Solution)

The working product was slightly etched, but remained on the surface of the optical waveguide 9A. Etching traces were not observed on the surface of the waveguide.

(Etchant 3: Aqueous Solution of a Strong Acid)

The working product was slightly etched, but almost remained on the surface of the optical waveguide. Etching traces were observed on the surface of the waveguide.

(Etchant 4: Aqueous Solution of Weak Acid)

The working product was etched, but remained on the surface of the optical waveguide. Etching traces were not observed on the surface.

As described above, according to the invention, it is possible to produce an optical waveguide by irradiating laser beam onto an oxide single crystal material and to prevent the scattering of light from the surface of the optical waveguide when light is transmitted through the waveguide.

The present invention has been explained referring to the preferred embodiments. The invention is, however, not limited to the illustrated embodiments which are given by way of examples only, and may be carried out in various modes without departing from the scope of the invention.

What is claimed is:

1. A method for producing an optical waveguide, the method comprising the steps of:

irradiating a laser beam onto an oxide single crystal material so that said material is worked by said laser beam to form an optical waveguide portion having a laser working face; and subjecting said laser working face to a wet etching treatment using a strong alkaline aqueous solution to provide an optical waveguide, wherein said oxide single crystal material is a complex oxide of lithium and one or more elements selected from the group consisting of niobium, tantalum and potassium.

2. The method of claim 1, wherein said oxide single crystal material is selected from the group consisting of lithium niobate, lithium tantalate and a lithium niobate-lithium tantalate solid solution.

3. The method of claim 2, wherein said oxide single crystal material is lithium niobate.

4. The method of claim 1, wherein said oxide single crystal material is selected from the group consisting of potassium lithium niobate, potassium lithium tantalate and a potassium lithium niobate-potassium lithium tantalate solid solution.

5. The method of claim 1, wherein a working product formed by said laser beam on said laser working face is removed by said wet etching treatment.

6. The method of claim 5, wherein said working product comprises the oxide or oxides of one or more of said metal elements constituting said oxide single crystal material.

7. The method of claim 5, wherein said oxide single crystal material is selected from the group consisting of lithium niobate, lithium tantalate and a lithium niobate-lithium tantalate solid solution.

8. The method of claim 7, wherein said oxide single crystal material is lithium niobate and said working product is mainly composed of niobium oxide.

9. The method of claim 5, wherein said oxide single crystal material is selected from the group consisting of potassium lithium niobate, potassium lithium tantalate and a potassium lithium niobate-potassium lithium tantalate solid solution.

10. An optical waveguide produced by the method of claim 1.

11. An optical waveguide produced by the method of claim 3.

12. An optical waveguide produced by the method of claim 5.

13. A frequency converting device of quasi-phase-matched system, comprising:

said optical waveguide of claim 10; and a periodically reversed polarization structure formed in said optical waveguide.

14. The device of claim 13, wherein said oxide single crystal material is lithium niobate.

15. The device of claim 13, wherein a working product formed by said laser beam on said laser working face is removed by said wet etching treatment.

* * * * *